US007870164B2

(12) United States Patent
Miller et al.

(10) Patent No.: US 7,870,164 B2
(45) Date of Patent: Jan. 11, 2011

(54) DATABASE PART CREATION, MERGE AND REUSE

(75) Inventors: Andrew R. Miller, Issaquah, WA (US); Sumit Chauhan, Sammamish, WA (US); Robert E. Coggins, Bellevue, WA (US); Michael J. McCormack, Snohomish, WA (US); Scott T. Gardner, Seattle, WA (US); Jason A. Bould, Bellevue, WA (US); David Jon Conger, Issaquah, WA (US); Suraj Poozhiyil, Seattle, WA (US); Vijay Mital, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 368 days.

(21) Appl. No.: 11/942,963

(22) Filed: Nov. 20, 2007

(65) Prior Publication Data
US 2009/0132576 A1 May 21, 2009

(51) Int. Cl.
*G06F 17/30* (2006.01)
(52) U.S. Cl. ...................................... 707/802
(58) Field of Classification Search ............... 707/1, 707/10, 100–102, 104.1, 661, 792, 802, 803, 707/808; 715/200, 209
See application file for complete search history.

(56) References Cited

U.S. PATENT DOCUMENTS

| 5,826,257 | A * | 10/1998 | Snelling, Jr. ............... 1/1 |
| 6,526,423 | B2 | 2/2003 | Zawadzki et al. |
| 6,604,100 | B1 | 8/2003 | Fernandez et al. |
| 6,618,736 | B1 | 9/2003 | Menage |
| 7,020,660 | B2 | 3/2006 | Woodring |
| 7,269,593 | B2 * | 9/2007 | Minamino et al. ............ 1/1 |
| 7,287,218 | B1 * | 10/2007 | Knotz et al. ............... 715/209 |
| 7,302,444 | B1 | 11/2007 | Dunmore |
| 7,376,891 | B2 | 5/2008 | Hitchock |
| 2003/0115176 | A1 | 6/2003 | Boroff |
| 2004/0243550 | A1 * | 12/2004 | Gu et al. ............... 707/3 |
| 2005/0066050 | A1 | 3/2005 | Dharamshi |
| 2005/0172221 | A1 | 8/2005 | Kobashi et al. |
| 2006/0005127 | A1 | 1/2006 | Ferguson et al. |
| 2006/0095833 | A1 * | 5/2006 | Orchard et al. ............ 715/503 |

(Continued)

OTHER PUBLICATIONS

"Digital Document Manager" http//www.programurl.com/digital-document-rnanager.htm, Jul. 17, 2007.

(Continued)

*Primary Examiner*—Cam-Linh Nguyen
(74) *Attorney, Agent, or Firm*—Merchant & Gould, P.C.

(57) ABSTRACT

Embodiments are provided to merge, manage, create, and reuse database parts in a computer system. Database parts may include database tables, datatypes, field combinations or entire databases. A selection of a database part is received by a database software application executing on a computer system. The application may be configured to check for metadata associated with the database part to identify an action property. If, after checking for the metadata, a merge action property is identified, then the application may check for a metadata property associated with a database table. If a merge action associated with the database table is identified, then the application may merge the database part with the database table in the database. The application may also be configured to generate a user interface for creating database parts using database tables and for creating a database part by saving a database.

17 Claims, 5 Drawing Sheets

U.S. PATENT DOCUMENTS

| | | |
|---|---|---|
| 2006/0167760 A1 | 7/2006 | Chakraborty et al. |
| 2006/0167860 A1 | 7/2006 | Eliashberg et al. |
| 2007/0038929 A1 | 2/2007 | Miyazawa |
| 2007/0088741 A1 | 4/2007 | Brooks et al. |
| 2007/0299823 A1 | 12/2007 | Getsch |
| 2008/0077552 A1* | 3/2008 | Sanborn .................. 707/2 |
| 2009/0204635 A1 | 8/2009 | McCormack et al. |
| 2009/0248740 A1 | 10/2009 | McCormack et al. |

OTHER PUBLICATIONS

"Client and server-side templating with Velocity—Basic template engine operation", http://www.developertutorials.com/tutorials/java/templating-with-velocity/page2.html, Jul. 17, 2007.

Primasoft PC: "Digital Document Manager" http://www.programurl.com/digital-document-manager.htm, Jul. 17, 2007, pp. 1-3.

Sing Li "Client and server-side templating with Velocity—Basic template engine operation", http://www.developertutorials.com/tutorials/java/templating-with-velocity/page2.html, Jul. 17, 2007, pp. 1-5.

Microsoft Business Solutions for Analytics—Great Plains, Jun. 2003, pp. 1-16 http://download.microsoft.com/download/4/8/8/4884dcc2-bd71-4286-bfb7-e1360bb38a87/GreatPlains_Analytics.pdf.

BEA Weblogic Workshop Help. Verrsion 8.1 SP4, Dec. 2004, pp. 1-180. http://edocs.bea.com/workshop/docs81/pdf/files/portal/PortalJSPTags.pdf.

Sing Ali: "Client and Server-Side Templating with Velocity", Jun. 13, 2004, pp. 1-5 http://www.developertutorials.com/tutorials/java/templating-with-velocity/page2.html.

* cited by examiner

DATABASE PART CREATION, MERGE AND REUSE

BACKGROUND

Many database software applications allow the creation and utilization of database templates to facilitate the building of solutions using database data. For example, a user may create a template comprising a form with appropriate fields to facilitate the input of contact data for doctors employed by a medical facility and may further create another template comprising a form with fields to input patient contact data. Currently however, database template design suffers from a number of drawbacks. One drawback is that with conventional database software applications, databases must be created with limited or no assistance from the software, making the database creation process a long and often tedious process requiring a skill level above that of the average database user. Another drawback with current database software is that templates, once created, may not be combined or merged together with existing solutions (e.g., other templates). It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to merge, manage, create, and reuse database parts in one or more databases on a computer system. Database parts may include tables, datatypes, field combinations or entire databases. Database parts may also be utilized to facilitate the building of solutions to accomplish basics tasks such as entering contact information in a database table. In one embodiment, a selection of a database part is received by a database software application executing on a computer system. The application may be configured to check for metadata associated with the database part to identify an action property. If, after checking for the metadata, a merge action property is identified, then the application may check for a metadata property associated with a database table. If a merge action associated with the database table is identified, then the application may merge the database part with the database table in the database.

In another embodiment, a database software application may be utilized to generate a user interface comprising fields for receiving instructions associated with creating a database part. The application may then receive instructions in the user interface to create a database part having a relationship with at least one database table although a database part may also be created which does not have a relationship with a database table. The instructions may include a name of the database part, an icon for the database part, and a category for the database part. The application may then save a file including the received instructions to create the database part.

In yet another embodiment, a database gallery representative of a database is displayed in a user interface generated by a database software application. The application may also display a selectable functionality control in the user interface which may be utilized to save the database as a new database part.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Figure 1:
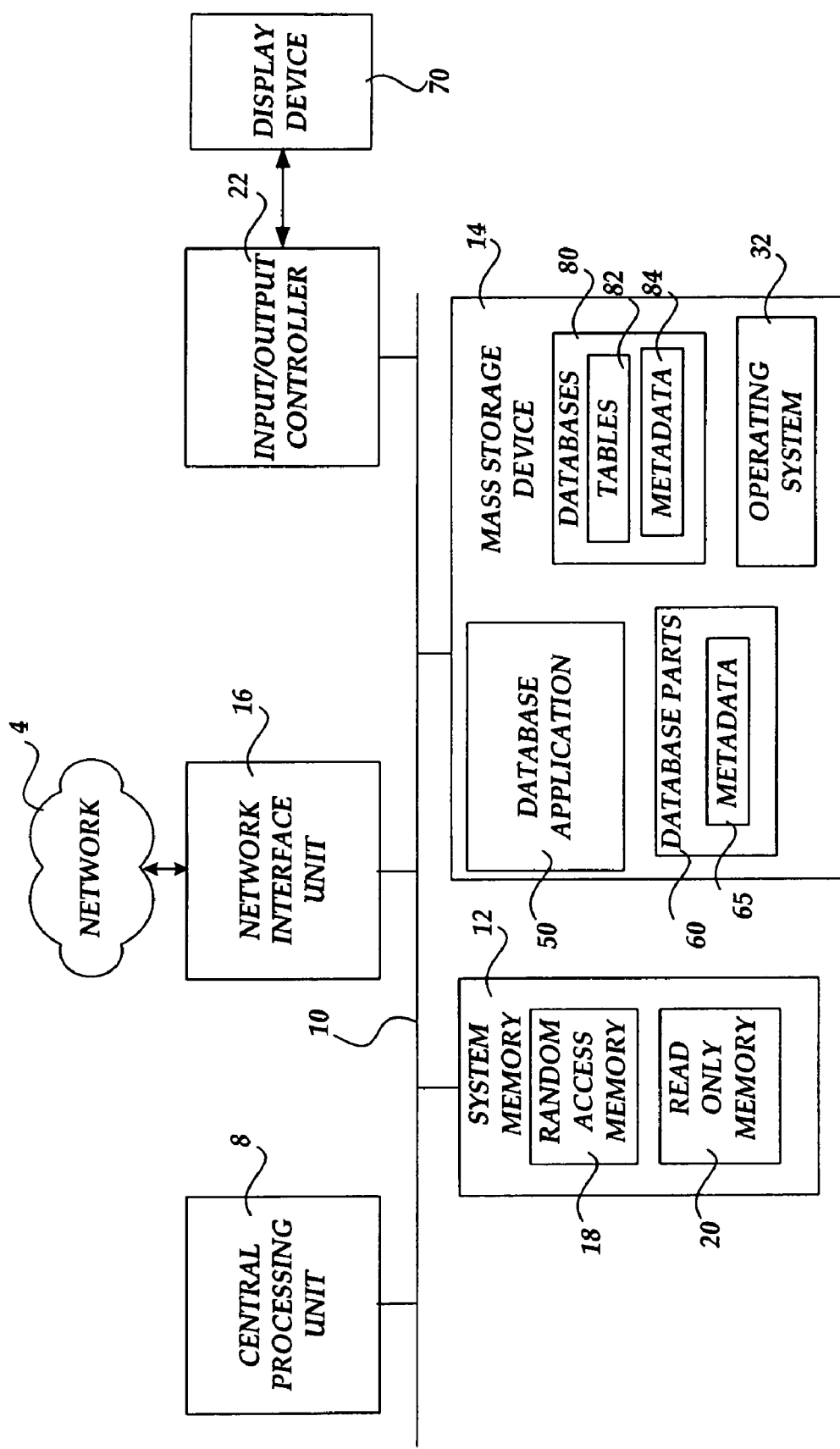
FIG. 1 is a block diagram illustrating a computing environment which may be utilized for merging, managing, creating, and reusing database parts, in accordance with various embodiments.

Embodiments are provided to merge, manage, create, and reuse database parts in one or more databases on a computer system. Database parts may include tables, datatypes, field combinations or entire databases. Database parts may also be utilized to facilitate the building of solutions to accomplish basics tasks such as entering contact information in a database table. In one embodiment, a selection of a database part is received by a database software application executing on a computer system. The application may be configured to check for metadata associated with the database part to identify an action property. If, after checking for the metadata, a merge action property is identified, then the application may check for a metadata property associated with a database table. If a merge action associated with the database table is identified, then the application may merge the database part with the database table in the database.

In another embodiment, a database software application may be utilized to generate a user interface comprising fields for receiving instructions associated with creating a database part. The application may then receive instructions in the user interface to create a database part having a relationship with at least one database table although a database part may also be created which does not have a relationship with a database table. The instructions may include a name of the database part, an icon for the database part, and a category for the database part. The application may then save a file including the received instructions to create the database part.

In yet another embodiment, a database gallery representative of a database is displayed in a user interface generated by a database software application. The application may also display a selectable functionality control in the user interface which may be utilized to save the database as a new database part.

Referring now to the drawings, in which like numerals represent like elements, various illustrative embodiments will now be described.

Exemplary Operating Environment

Referring now to FIG. 1, the following discussion is intended to provide a brief, general description of a suitable computing environment in which various illustrative embodiments may be implemented. While various embodiments will be described in the general context of program modules that execute in conjunction with program modules that run on an operating system on a personal computer, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with other computer system configurations, including hand-held devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 1 shows a computer 2 which may include a general purpose desktop, laptop, handheld, tablet, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing an operating system 32, a database application 50, database parts 60, database parts metadata 65, databases 80, database tables 82, and database metadata 84. In accordance with various embodiments, the operating system 32 may be suitable for controlling the operation of a networked personal computer, such as the WINDOWS operating systems from MICROSOFT CORPORATION of Redmond, Wash. The database application 50 may comprise the ACCESS database creation and management desktop application program, also from MICROSOFT CORPORATION of Redmond, Wash. It should be understood that, in accordance with an embodiment, the database application 50 may be configured to merge, manage, create, and reuse the database parts 60. It should be further understood that, as defined herein, the database parts 60 may include, but are not limited to, tables, data types, field combinations or entire databases. The database parts 60 may be utilized to facilitate the building of solutions to accomplish basics tasks such as entering contact information in a database table. The database parts 60 may be stored as files (e.g., template files) on the computer 2.

The database parts metadata 65 may include properties associated with each of the database parts 60 which may be checked by the database application 50 to determine whether to merge, junction, or import the database parts 60. For example, the metadata 65 may include an action property for identifying a merge, junction, or import instruction associated with the database parts 60. In accordance with one embodiment, the database application 50 may be configured to merge tables comprising or included in the database parts 60 with the database tables 82, if an action property associated with one of the database parts 60 includes a merge instruction, in which case a new table is created having a relationship with the individual tables being merged. For example, in accordance with one embodiment, the database application 50 may be configured, in response to checking the metadata 65, to automatically merge a table of doctor information from a database part 60 with a table of patient information from a database 80 to create a new table containing the doctor information and patient information having a relationship with the individual and distinct doctor and patient tables being merged. The relationship is created by the metadata 65 and is defined by a foreign key in one table that correlates to data stored in the other tables. The metadata 65 (as well as the metadata 84) may also include an ID property for identifying a table type (associated with a database part table or a database table). As will be described in greater detail below with respect to FIG. 5, the database application 50 may utilized table type information associated with a database part 60 and a database table 82 to determine whether to merge, junction, or import the database part 60. In one embodiment, the metadata 65 and 84 may comprise XML data.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network or a wide area network (e.g., the Internet), for example. The computer 2 may connect to the network 4 through a network interface unit 16 connected to the bus 10. It should be appreciated by those skilled in the art that when operating in a networked environment, the computer 2 may be in communication with one or more remote servers hosting a shared database services platform such as the EXCEL/ACCESS SERVICES platform from Microsoft Corporation of Redmond, Wash. It should be appreciated that the network interface unit 16 may also be utilized to connect to other types of networks and remote computing systems. The computer 2 may also include an input/output controller 22 for receiving and processing input from a number of input types, including a keyboard, mouse, pen, stylus, finger, and/or other means. Similarly, an input/output controller 22 may provide output to a display device 70, a printer, or other type of output device. Additionally, a touch screen can serve as an input and an output mechanism.

As mentioned briefly above, a number of program modules and data files may be stored in the mass storage device 14 and RAM 18 of the computer 2 such as the operating system 32. The mass storage device 14 and RAM 18 may also store one or more program modules.

Figure 2:
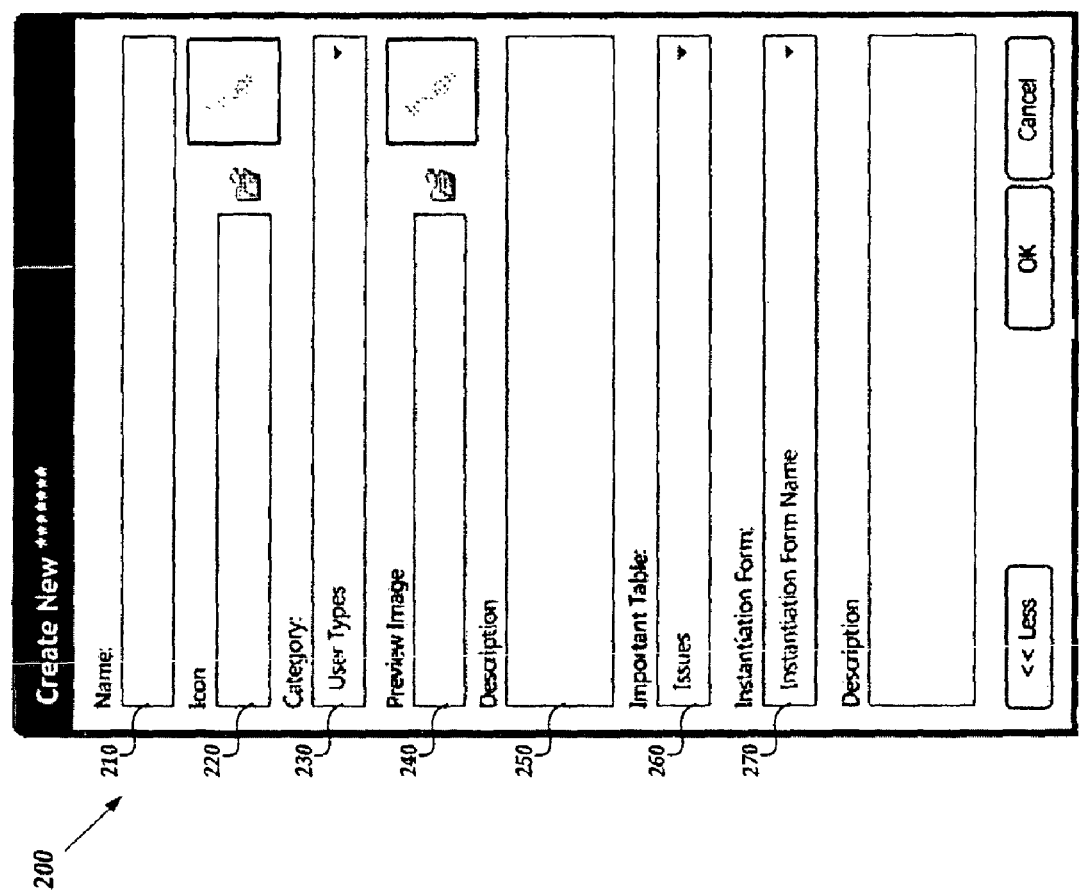
FIG. 2 is a computer screen display of a user interface for creating database parts, in accordance with one embodiment.

FIG. 2 is a computer screen display of a user interface 200 for creating database parts which may be generated by the database application 50, in accordance with one embodiment.

The user interface 200 includes a Name text box 210, an Icon text box 220, a Category combo box 230, a Preview Image text box 240, a Description text box 250, an Important Table combo box 260, and an Instantiation Form combo box 270.

The Name text box 210 may be utilized by a user of the database application 50 to specify a name of a database part to be created. It should be appreciated that the name entered into the Name text box 210 may be used as the file name for the database part. File names that are over a certain character length may be truncated and invalid characters may be replaced with an underscore ("") character.

The Icon text box 220 may be utilized by the database application 50 to display a file location of an icon image selected by a user to represent a database part. The Category combo box 230 may be utilized by a user of the database application 50 to select a category for the database part to appear in. In particular, a user may select a category from a drop-down list of known database part categories (for example, "User Templates") in the Category combo box 230. The user may also enter a string in the Category box 230 to define a new database part category.

The Preview Image text box 240 may be utilized by a user of the database application 50 to display a file location of an image file selected by a user to serve as a preview image for a database part. The Description text box 250 may be utilized by a user of the database application 50 to enter a description to be used for a database part.

The Important Table combo box 260 may be utilized by a user of the database application 50 to select a table (from among the database tables 82, for example) with which to create a relationship when importing a database part 60. In particular, a user may select a table from a drop-down list of database tables (for example, "Issues") comprising the database tables 82 in the Important Table combo box 260. The selection of the table from the Important Table combo box 260 also designates that table for use by the database application 50 for junctioning, and merging. As will be described in greater detail below with respect to FIG. 5, junctioning may establish a relationship between one or more database parts 60 and one or more database tables 82 in the databases 80. It will be appreciated that the relationship created by a junction may be "one to many" or "many to one" with respect to the database parts 60 and the database tables 82. For example, a junction may create a relationship from a single database table 82 to many database parts 60 or from a single database part 60 to many database tables 82.

The Instantiation Form combo box 270 may be utilized by a user of the database application 50 to select a form to be displayed on the first instance when a database part 60 (e.g., a template) is created. The instantiation form may be utilized to insert and remove database fields and data in a database part 60. In accordance with various embodiments, a selected instantiation form may only be available upon instantiation of a database part 60 and will be opened before any database is opened or events for a database part 60 are fired. Once an instantiation form has been opened, it may be deleted (i.e., discarded) by the database application 50 after it is closed or the form may be saved by a user.

Figure 3:
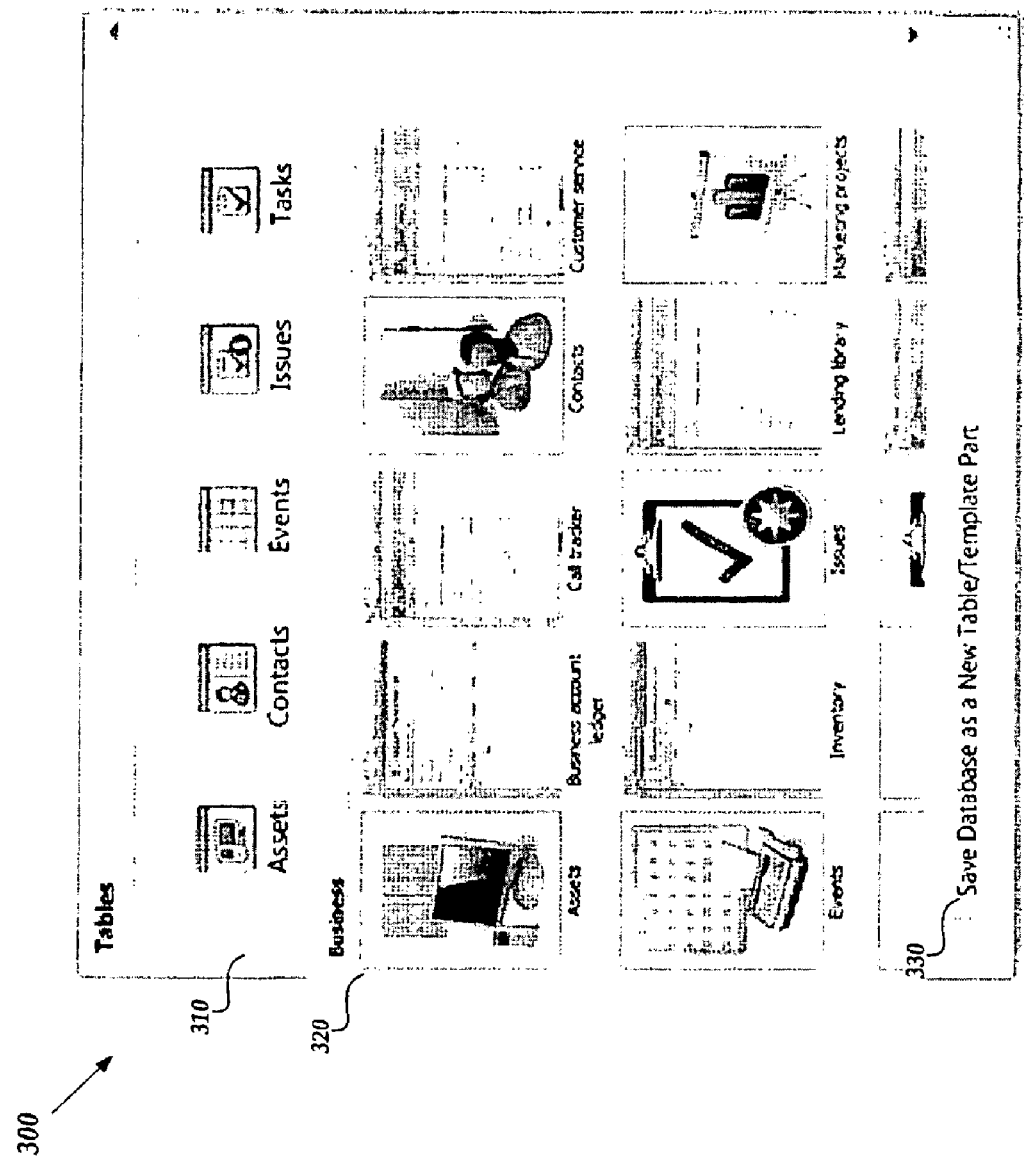
FIG. 3 is a computer screen display of a user interface which may be utilized to create database parts from a database, in accordance with one embodiment.

FIG. 3 is a computer screen display of a user interface 300, which may be generated by the database application 50, to create database parts from a database, in accordance with one embodiment. The user interface 300 includes the display of a database table data type gallery 310, a database table gallery 320, and a selectable functionality control or button 330. The database table data type gallery 310 may include icons which identify data types associated with database tables such as Assets, Contracts, Events, Issues, and Tasks. The database table gallery 320 may include icons which identify the available tables in a particular database. The selectable functionality control 330 may be selected by a user of the database application 50 to save a database (i.e., the database tables and the database types) as a database part (e.g., a template). In accordance with one embodiment, the database part may be saved as a template file to a trusted directory of "safe" templates which may be imported into trusted databases among the databases 80 stored on the computer 2. It will be appreciated by those skilled in the art that safe templates may be digitally signed files having a trusted signature which may be incorporated into a certificate file. It should be understood by those skilled in the art that there are a number of methods to indicate the safety of templates including, but not limited to, the use of signatures.

Figure 4:
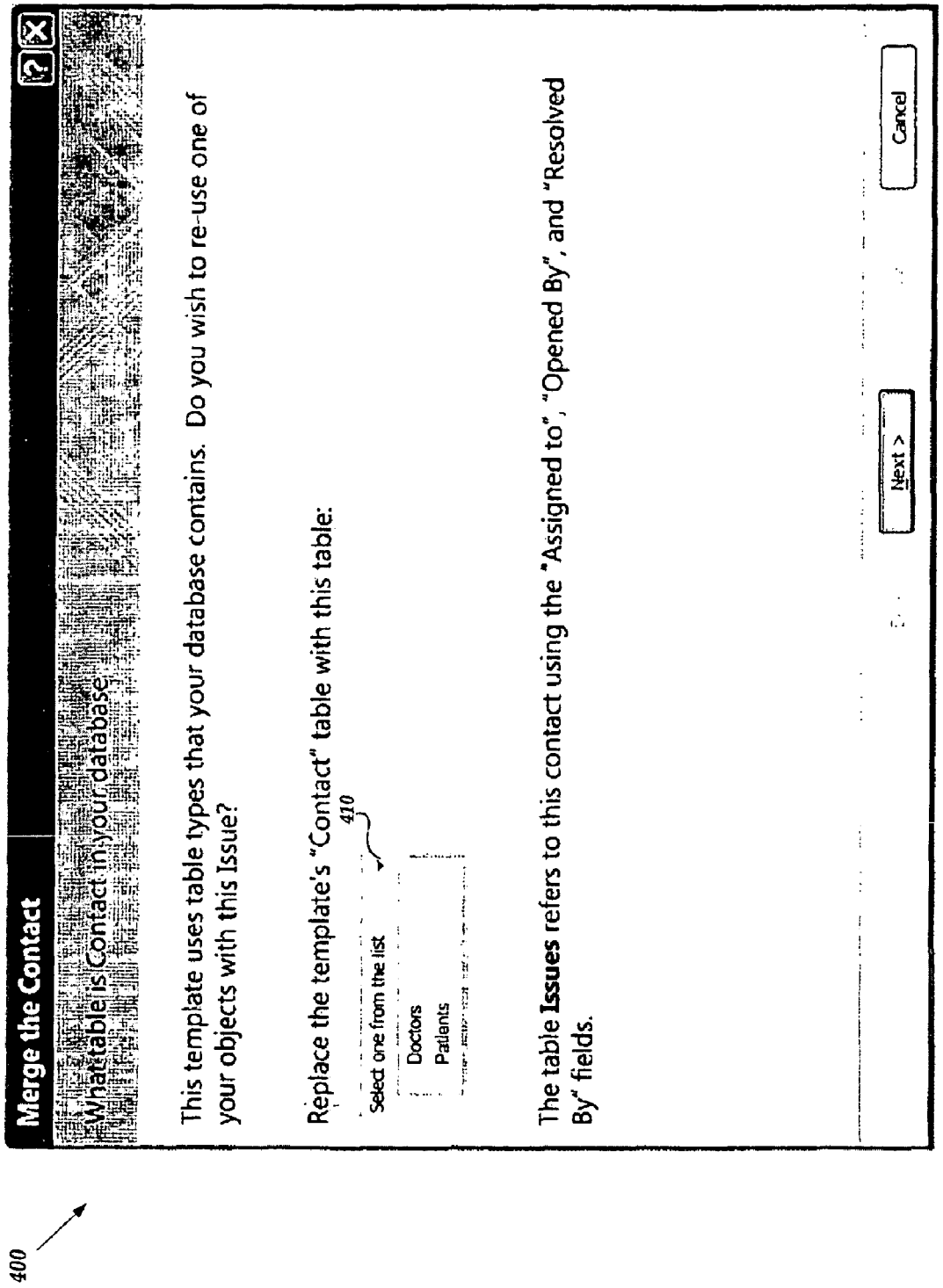
FIG. 4 is a computer screen display of a user interface for reusing database parts, in accordance with one embodiment.

FIG. 4 is a computer screen display of a user interface 400, which may be generated by the database application 50, for reusing database parts, in accordance with one embodiment. The user interface 400 displays a combo box 410 from which a user may select a database table having a particular table type from a dropdown list. The selected database table may be utilized to replace a database part table. Thus, for example, a database "Doctors" table may be reused to replace a database part "Contact" table.

Figure 5:
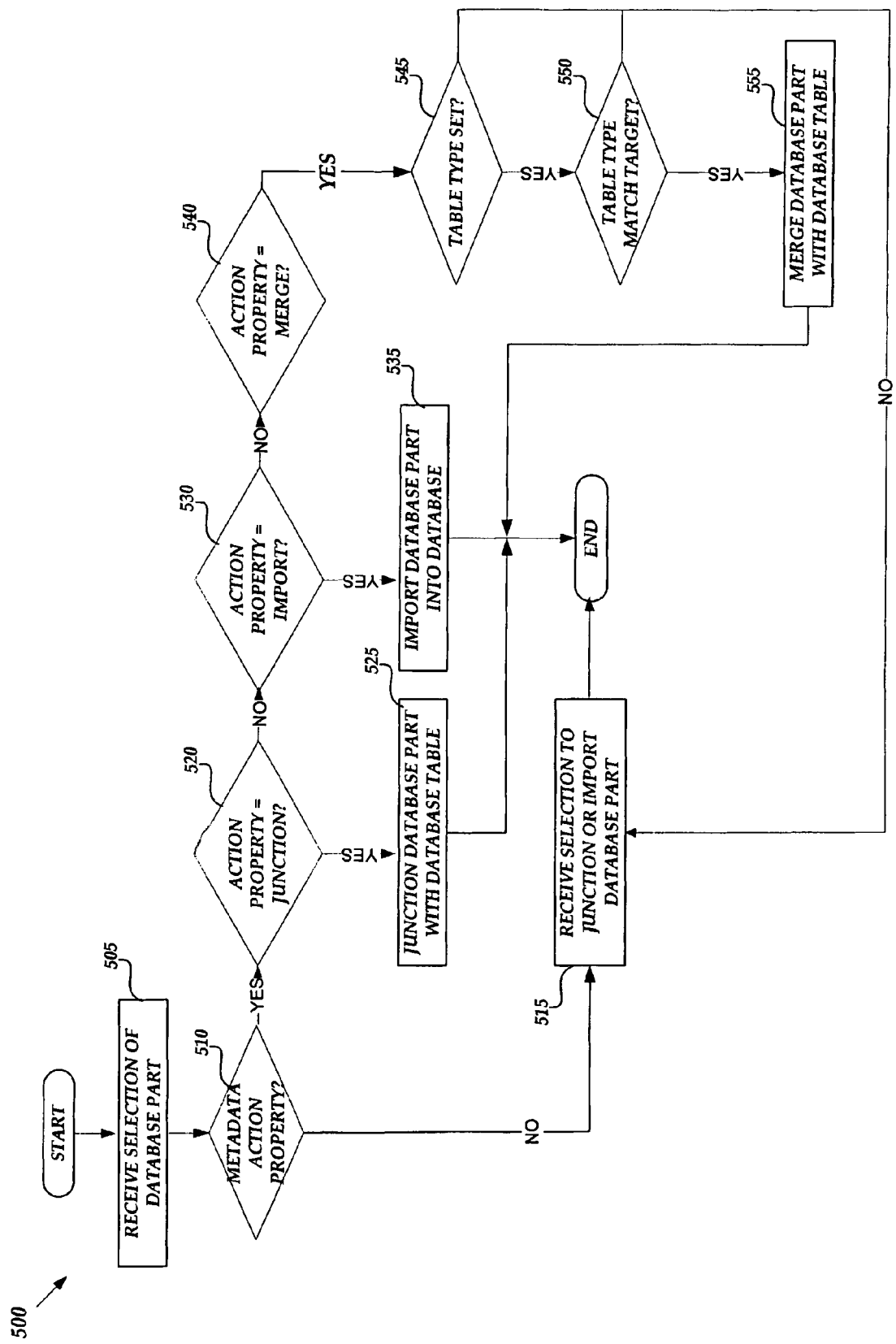
FIG. 5 is a flow diagram illustrating a routine for merging database parts, in accordance with one embodiment.

FIG. 5 is a flow diagram illustrating a routine 500 for merging database parts, in accordance with one embodiment. The components of FIG. 1 are referred to in the description of FIG. 5, but the embodiment is not so limited. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIG. 5 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 500 begins at operation 505, where the database application 50 executing on the computer 2 receives the selection of a database part 60. For example, a user may select a table comprising a database part 60 from a gallery of database parts 60 generated by the database application 50.

From operation 505, the routine 500 continues to operation 510, where the database application 50 determines whether the metadata 65 for database part 60 includes an action property. As discussed above with respect to FIG. 1, database parts may include metadata including properties which may be used to determine whether to merge, junction, or import database parts. If at operation 510, it is determined that the metadata 65 does not include an action property, then the routine 500 continues to operation 515 where the database application 50 receives a selection from a user to junction or import the selected database part 60. In particular, the database application 50 may be configured to request a user input to junction (i.e., establish a relationship between) the database part 60 and one or more of the tables 82 in one of the databases 80, or import the database part 60 as a table into one of the databases 80. In accordance with one embodiment, if a user input is not received, the database application 50 may be configured to default to an import action with respect to the selected database part 60. From operation 515, the routine 500 then ends.

If at operation 510, the database application 50 determines that the metadata 65 for the selected database part 60 includes an action property, the routine 500 branches to operation 520 where the database application 50 determines if the action property indicates a junction action. If at operation 520, the database application 50 determines that the action property indicates a junction action, then the routine 500 continues from operation 520 to operation 525 where the database application 50 junctions the selected database part 60 with one or more of the tables 82 in one of the databases 80. From operation 525, the routine 500 then ends.

If at operation 520, the database application 50 determines that the action property does not indicate a junction action, then the routine 500 branches to operation 530 where the database application 50 determines if the action property indicates an import action. If at operation 530, the database application 50 determines that the action property indicates an import action, then the routine 500 continues from operation 530 to operation 535 where the database application 50 imports the database part 60 as a table into one of the databases 80. If at operation 530, the database application 50 determines that the action property does not indicate an import action, then the routine 500 branches to operation 540 where the database application 50 determines if the action property indicates a merge action.

If at operation 540, the database application 50 determines that the action property indicates a merge action, then the routine 500 continues from operation 540 to operation 545 where the database application 50 determines whether a table type is set for the selected database part 60. In particular, the database application 50 may be configured to check the metadata 65 for an ID property associated with the selected database part 60 to determine a database part table type. For example, database part table types may include Assets tables, Contracts tables, Events tables, Issues tables, and Tasks tables (among others).

If at operation 545, the database application 50 determines that a table type is set for the selected database part 60, then the routine 500 continues to operation 550 where the database application 50 determines if the table type for the selected database part 60 matches a target table type associated with one or more of the tables 82 in the databases 80. In particular, the metadata 84 associated with the databases 80 may include table type information for each of the tables 82. The target table type may include a table type for one or more of the tables 82 in the databases 80 which have been targeted by a user for merging.

If at operation 550, the database application 50 determines that the table type for the selected database part 60 matches the table type of one or more target database tables 82, then the routine 500 continues to 555 where the database application 50 merges the selected database part 60 with one or more target database tables 82 to create a new database table having a relationship with the selected database part 60 and the one or more target database tables 82. It should be understood that if there is a single database table 82 having a table type matching the selected database part 60, then the database application 50 may be configured to automatically merge the two tables. On the other hand, if there are multiple database tables 82 having a table type matching the selected database part 60, then the database application 50 may be configured to request a user input for choosing a database table or tables 82 to merge with the selected database part 60. From operation 555, the routine 500 then ends.

Returning now to operation 545, if the database application 50 determines that a table type is not set for the selected database part 60, then the routine 500 returns to operation 515 where the database application 50 receives a selection from a user to junction or import the selected database part 60. Returning now to operation 550, if the database application 50 determines that the table type for the selected database part 60 does not match the table type of any of the target database tables 82, then the routine 500 returns to operation 515 where the database application 50 receives a selection from a user to junction or import the selected database part 60.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method in a computer system for merging database parts into a database, comprising:

receiving, by a computer, a selection of a database part, the database part comprising a table;

checking, by the computer, for metadata associated with the database part to identify an action property, wherein the action property comprises metadata comprises an ID property for identifying a table type associated with at least one of the database part and at least one database table in the database;

if, after checking for the metadata, a merge action property is identified, then determining from the metadata, by the computer, if a table type is set for the database part;

if it is determined that a table type is set for the database part then determining, by the computer, whether the table type matches a target table type for the at least one database table in the database; and if the table type matches the target table type, merging, by the computer, the database part with the at least one database table in the database, wherein merging the database part with the at least one database table in the database comprises automatically merging table information from the database part with table information from the at least one database table to create a new table containing the table information from the database part and the table information from the at least one database table, the new table having a relationship with the database part and the at least one database table, wherein the relationship is created by the metadata and defined by a foreign key in one of the database part and the at least one database table that correlates to data stored in an other one of the database part and the at least one database table.

2. The method of claim 1 further comprising if, after checking for the metadata, an action property is not identified, then receiving a selection to perform at least one of importing the database part into the database and junctioning the database part with the at least one database table in the database.

3. The method of claim 1 further comprising if it is determined that the table type is not set for the database part, then junctioning the database part with the at least one database table in the database.

4. The method of claim 1 further comprising if the table type does not match a target table type for the at least one database table in the database, then receiving a selection to perform at least one of importing the database part into the database and junctioning the at database part with the at least one database table in the database.

5. The method of claim 1 further comprising if, after checking for the metadata, a junction action property is identified, then junctioning the database part with the at least one database table in the database.

6. The method of claim 5, wherein junctioning the database part with the at least one database table in the database comprises establishing a relationship between the database part and the at least one database table in the database.

7. The method of claim 1 further comprising if, after checking for the metadata, an import action property is identified, then importing the database part with the at least one database table in the database.

8. The method of claim 1, wherein receiving a selection of a database part comprises receiving a selection of a database template file.

9. The method of claim 1, wherein checking for metadata associated with the database part to identify an action property comprises checking XML data associated with the database part.

10. The method of claim 1, wherein determining whether the table type matches a target table type for the at least one database table in the database comprises determining whether the table type matches a target table type for a plurality of database tables in the database.

11. The method of claim 10, wherein if the table type matches a target table type for a plurality of database tables in the database, then receiving a selection of one of the plurality of database tables to merge with the database part.

12. A system of creating and managing database parts, comprising:
- a memory for storing executable program code; and
- a processor, functionally coupled to the memory, the processor being responsive to computer-executable instructions contained in the program code and operative:
  - to display a user interface comprising fields for receiving instructions associated with creating a database part, the user interface further comprising an important table combo box;
  - to receive instructions in the user interface to create a database part having a relationship with at least one database table, the instructions including at least a name of the database part, an icon for the database part, and a category for the database part;
  - to display a file location of a selected icon image representing the database part in the user interface in response to receiving the instructions;
  - to save a file comprising the received instructions to create the database part; and
  - to receive a selection of the at least one database table from the important table combo box, wherein the selection of the at least one database table from the important table combo box designates the at least one database table for junctioning and merging, wherein merging comprises automatically merging table information from the database part with table information from the at least one database table to create a new table containing the table information from the database part and the table information from the at least one database table, the new table having a relationship with the database part and the at least one database table, wherein the relationship is created by metadata and defined by a foreign key in one of the database part and the at least one database table that correlates to data stored in an other one of the database part and the at least one database table.

13. The system of claim 12, wherein the processor is further operative to receive an instruction in the user interface to create an instantiation form associated with the database part, wherein the instantiation form is utilized to insert and remove database fields and data in the database part.

14. The system of claim 12, wherein the processor is further operative to receive, in the user interface, a selection of a priority table utilized in creating relationships with data when the database part is imported into the database.

15. The system of claim 12, wherein the processor in saving a file comprising the received instructions to create the database part is operative to save the file in a trusted directory, the trusted directory comprising a directory of safe templates which are imported into trusted databases.

16. The system of claim 12, wherein the processor in saving a file comprising the received instructions to create the database part is operative to create a database template.

17. A computer-readable storage medium containing computer executable instructions which, when executed on a computer, will cause the computer to perform a method for displaying on a display device a user interface for creating a database part from a database, comprising:
- displaying a database data type gallery and a database table gallery representative of a database in the user interface, the database data type gallery comprising a first plurality of icons which identify data types associated with database tables, the data types comprising assets, contracts, events, issues and tasks, the database table gallery comprising a second plurality of icons which identify available tables in the database;
- displaying a selectable functionality control proximate to the gallery; and
- receiving a selection of the selectable functionality control to save both of the database types and the database tables as a new database part, wherein the new database part is saved as a template file to a trusted directory of safe templates, the safe templates comprising a plurality of digitally signed files having a trusted signature which is incorporated into a certificate file, wherein the safe templates are imported into at least one trusted database.

* * * * *